Figure 1:
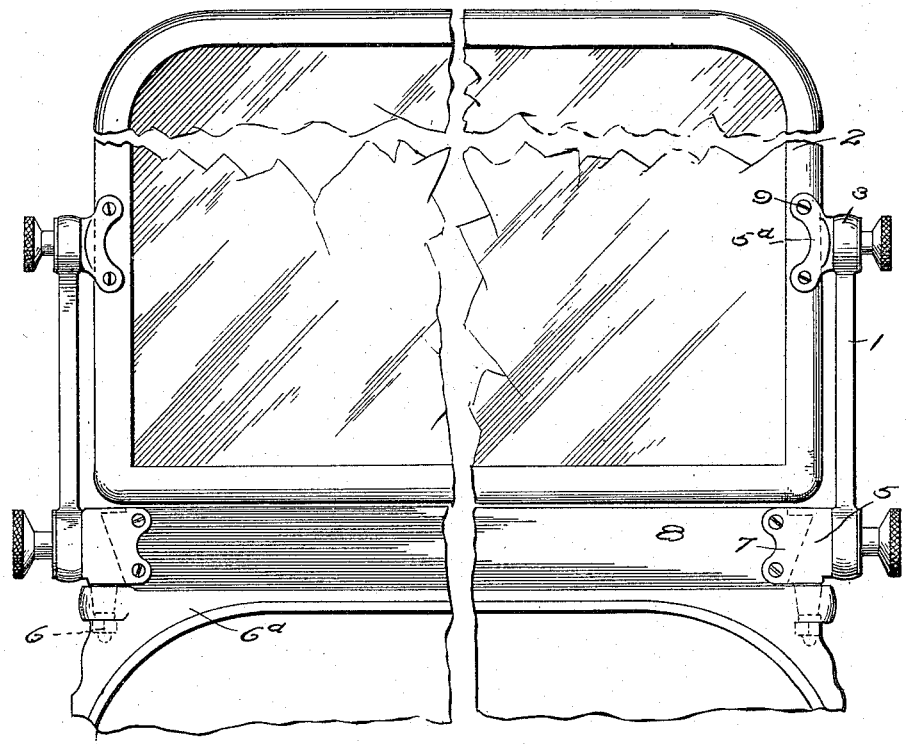

J. S. KERN.
WIND SHIELD FOR AUTOMOBILES.
APPLICATION FILED OCT. 28, 1913.

1,163,413.

Patented Dec. 7, 1915.
2 SHEETS—SHEET 1.

Inventor
Jacob S. Kern

Witnesses

By
Attorney

J. S. KERN.
WIND SHIELD FOR AUTOMOBILES.
APPLICATION FILED OCT. 28, 1913.
1,163,413.
Patented Dec. 7, 1915.
2 SHEETS—SHEET 2.
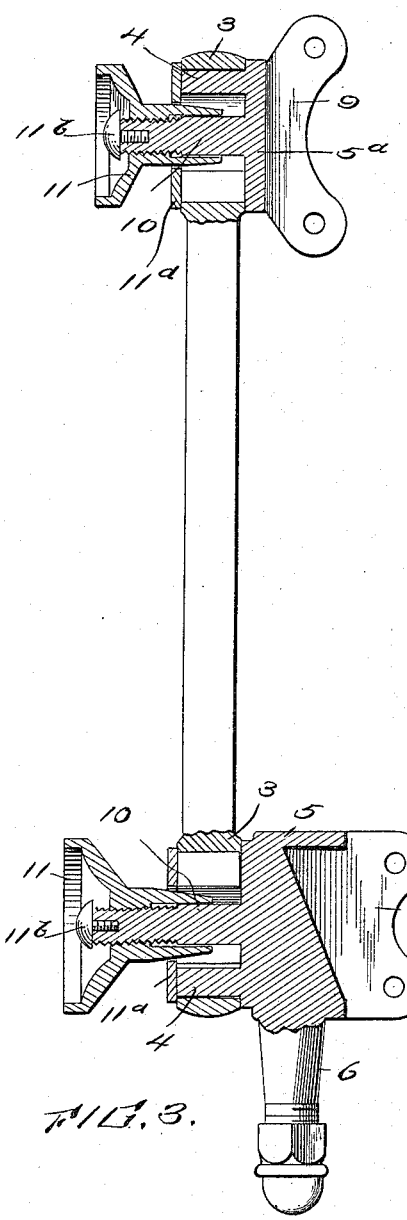
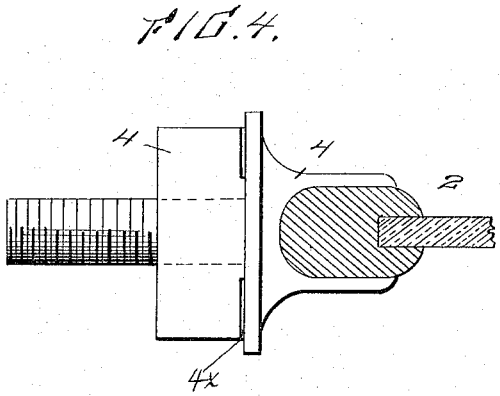
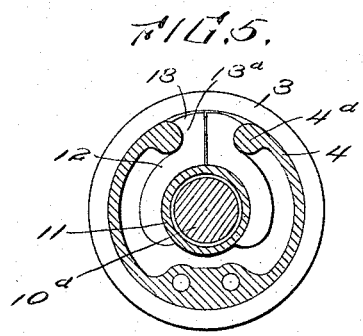
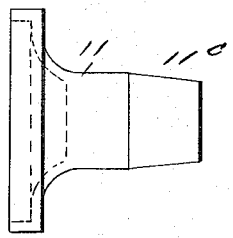
Inventor
Jacob S. Kern;
Witnesses
R. S. Trogner,
A. C. Newkirk
By John P. Duffy
Attorney

UNITED STATES PATENT OFFICE.

JACOB S. KERN, OF FLEETWOOD, PENNSYLVANIA.

WIND-SHIELD FOR AUTOMOBILES.

1,163,413.          Specification of Letters Patent.          Patented Dec. 7, 1915.

Application filed October 28, 1913. Serial No. 797,777.

*To all whom it may concern:*

Be it known that I, JACOB S. KERN, a citizen of the United States, residing at Fleetwood, in the county of Berks and State of Pennsylvania, have invented certain new and useful Improvements in Wind-Shields for Automobiles, of which the following is a specification.

This invention relates to improvements in wind guards or shields for automobiles or motors.

The invention has for its object to provide for readily adjusting and holding the wind guard or shield in suitable position or angularly, as may be desired.

A further object is to also effect the angular adjustment and retention in position of the wind guard or shield carrying arms or supports, themselves.

A still further object is to effect these ends principally by frictional action.

A still further object is to carry out the purposes of this invention in a simple, expeditious and effective manner and with facility.

The invention consists of cam-action dogs together with a resilient member for securing frictional holding action upon the wind guard or shield carrying arms or supports. Secondly, of manually operated means for manipulating said cam-action dogs for actuating said resilient member. Thirdly, of tubular screw-threaded members or nuts having a differential surface of contact or engagement with said cam-action members or dogs for their actuation. Fourthly, of screw-threaded studs or stems upon the brackets equipped with said wind-guard carrying arms, said studs or stems having the screw-threaded tubular members, sleeves or nuts fitted thereon for engaging the cam-action members or dogs. Fifthly, of preferably apertured enlargements of the wind-guard carrying arms and split resilient members within said apertured enlargements, the split or slot of said resilient member receiving the pivotal ends of the cam-action dogs, said cam-action dogs exerting pressure upon said resilient member through a member exerting a wedging action upon said dogs, said resilient member frictionally engaging said wind guard arm apertured end enlargements.

In the accompanying drawings is illustrated the preferred embodiment of my invention, wherein it will be understood that various changes and modifications may be made as to the detailed construction and arrangement of parts without departing from the spirit of the invention, and in which drawing—

Figure 2:
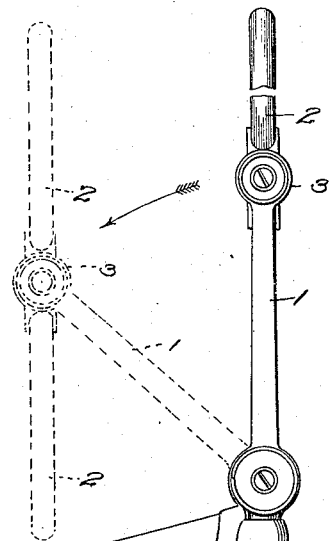

Figure 1 is a mutilated front elevation of my invention as applied to the automobile cowl. Fig. 2 is a side or edge elevation of the same. Fig. 3 is a partly elevational and partly sectional view of a wind-guard carrying arm, including the features of my improvement. Fig. 4 is a transverse or horizontal elevational view, taken through a side-bar and a portion of the glass plate of the wind-guard together with an edge view of an attaching bracket of an arm of the wind-guard. Fig. 5 is a vertical sectional view, showing more particularly coöperating cam-action dogs and an apertured end of one of the wind-guard carrying arms, receiving said cam-action dogs and a split resilient member. Fig. 6 is a detached side view of a tubular member or nut having a wedging action upon the cam-action dogs.

In carrying out my invention, I provide each of the carrying arms 1 of the wind-guard or shield 2 with a preferably apertured enlargement 3 at each end, said apertured enlargement being adapted to receive or encompass split or slotted annular extensions 4 of brackets 5, respectively, the lower of said brackets being adapted to be secured or bolted, as at 6, to the cowl 6$^a$ of an automobile or motor, and to be secured or connected together, as at 7, to a connecting bar or brace 8, the upper brackets 5$^a$ being suitably secured, as at 9, to the frame of the wind-guard or shield 2.

The annular split resilient members 4 owe their resiliency to a slit or cut 4$^x$ separating or severing each of the latter nearly its entire circumference from its respective bracket, as clearly shown.

Tubular nuts 11 having suitable knurled finger-engaged heads, are inserted through apertured closure rings or members 11$^a$ secured to the annular resilient members or extensions 4 of the brackets 5, 5$^a$ outside of the wind-guard arm end-enlargements 3, said nuts being retained against outward displacement and accordingly limited in their movement in that direction by means of headed screws 11$^b$ threaded into the outer ends of studs or stems, later described, of the brackets 5, 5$^a$. The inner end portions of the tubular nuts 11 are slightly beveled inwardly, as at 11ᶜ, providing for exerting a gradually increasing pressure or wedging action upon the cam-action dogs with which dogs they engage, as presently fully described, accordingly, causing said dogs to force the resilient members 4 outwardly against the wind-guard arm apertured end-enlargements and thus effectively secure the wind-guard arms at the desired angle.

The brackets 5 5ᵃ have their split annular or sleeve forming extensions or members 4 provided with central studs or stems 10', the outer end portions of which are suitably screw-threaded, the screw-threaded ends thereof having applied thereto the tubular or internally screw-threaded nuts 11, the threaded surface of said nuts, however, extending only a short distance inwardly from the outer ends of the bores thereof. The remaining portions of the bores of said nuts stand out from the threads of the studs or stems 10 but approach quite closely the inner unthreaded portion of the latter, as clearly disclosed by Fig. 3, it being designed that the nuts or sleeve may have threaded engagement with the studs only to such extent as to cause a binding or wedging action of the exterior surfaces of said sleeves or nuts, as they are screwed or turned inwardly upon the cam-action dogs 12, as above disclosed.

Peculiarly shaped dogs or members 12 each in a single casting and of general arcuate outline to adapt them to conform to the general contour of and to embrace the tubular or annular members or nuts 11, are inserted or disposed within the annular or sleeve extension forming portions 4 of the brackets 5 5ᵃ, said dogs having outer end portions 13 received between somewhat enlarged rounded terminals 4ᵃ of the bracket extensions 4 and within the slot or split between said terminals. Said dogs have their outer end portions 13 recessed or concaved, as at 13ᵃ, to receive the terminals 4ᵃ of the bracket-extensions 4 and allow of said dogs pivoting thereon as said dogs are actuated by the nuts 11, as has been made plain, it is thought. Also it will be observed that by means of the duplicate or upper and lower adjustments not only are the window-guard carrying arms adapted to be angularly adjusted in fixed position, but the wind-guard itself is also adapted to be relatively adjusted with respect to the arms as may be required for the proper position of the same, as will be appreciated.

It is thought that from the foregoing presentation, the facilities and advantages of my invention have been made fully apparent and therefore further or extended disclosure as to the operation, construction and application thereof is unnecessary for its understanding.

Having thus fully described my invention what I claim and desire to secure by Letters Patent, is:

A device of the type described including a wind-guard carrying arm, a bracket having an annular split resilient member received by said arm, said bracket also having a central projecting stud with its projecting portion screw-threaded, the inner portion of said stud being plain or unthreaded, a beveled tubular nut, the bore of which has screw-threaded connection at its outer end with the projecting or outer screw-threaded portion of said stud, the plain or unthreaded surfaces of said nut and stud being opposed to each other, said split resilient member itself having arms formed with spaced-apart rounded terminals, dogs having their outer terminals conforming to, and receiving the rounded terminals of said split resilient member for fulcruming said dogs thereon, the inner portions of said dogs receiving therebetween the beveled portion of said tubular nut, the unthreaded or plain surfaces of said nut and said stud providing for the inward movement of the beveled terminal or end of said nut, as in effecting engagement with said dogs.

In testimony whereof I affix my signature in presence of two witnesses.

JACOB S. KERN.

Witnesses:
SARAH E. SHAEFFER,
ESTELLA L. YODER.

Copies of this patent may be obtained for five cents each, by addressing the "Commissioner of Patents Washington, D. C."